United States Patent
Martz et al.

(10) Patent No.: US 9,213,807 B2
(45) Date of Patent: Dec. 15, 2015

(54) DETECTION OF CODE INJECTION ATTACKS

(71) Applicant: Raytheon BBN Technologies, Corp., Cambridge, MA (US)

(72) Inventors: Robert Martz, Laurel, MD (US); David Matthews, Ellicott City, MD (US); Joshua Edmison, Ellicott City, MD (US); Greg Vorsanger, Baltimore, MD (US)

(73) Assignee: RAYTHEON CYBER PRODUCTS, LLC, Herndon, VA (US)

( * ) Notice: Subject to any disclaimer, the term of this patent is extended or adjusted under 35 U.S.C. 154(b) by 169 days.

(21) Appl. No.: 14/018,234

(22) Filed: Sep. 4, 2013

(65) Prior Publication Data

US 2015/0067409 A1   Mar. 5, 2015

(51) Int. Cl.
*G06F 21/10* (2013.01)
*G06F 21/00* (2013.01)

(52) U.S. Cl.
CPC ...................................... *G06F 21/00* (2013.01)

(58) Field of Classification Search
CPC ......... G06F 21/12; G06F 21/14; G06F 21/55; G06F 21/552; G06F 21/554; G06F 21/566
See application file for complete search history.

(56) References Cited

U.S. PATENT DOCUMENTS

| | | | | |
|---|---|---|---|---|
| 5,732,273 | A * | 3/1998 | Srivastava et al. | 717/128 |
| 2002/0078381 | A1* | 6/2002 | Farley et al. | 713/201 |
| 2002/0184568 | A1* | 12/2002 | Kurrasch | 714/39 |
| 2003/0046563 | A1* | 3/2003 | Ma et al. | 713/190 |
| 2003/0172293 | A1* | 9/2003 | Johnson et al. | 713/200 |
| 2004/0003286 | A1* | 1/2004 | Kaler et al. | 713/201 |
| 2005/0125777 | A1* | 6/2005 | Calder et al. | 717/131 |
| 2006/0041747 | A1* | 2/2006 | Okumura et al. | 713/168 |
| 2006/0085854 | A1* | 4/2006 | Agrawal et al. | 726/23 |
| 2007/0039048 | A1* | 2/2007 | Shelest et al. | 726/22 |
| 2007/0226801 | A1* | 9/2007 | Gopalan et al. | 726/24 |
| 2007/0288762 | A1* | 12/2007 | Dale et al. | 713/189 |
| 2009/0144561 | A1* | 6/2009 | Davidson et al. | 713/190 |
| 2009/0282474 | A1* | 11/2009 | Chen et al. | 726/21 |
| 2010/0082513 | A1* | 4/2010 | Liu | 706/46 |
| 2011/0239003 | A1* | 9/2011 | Archer et al. | 713/189 |
| 2011/0296202 | A1* | 12/2011 | Henry et al. | 713/190 |
| 2012/0159193 | A1* | 6/2012 | Spradlin | 713/190 |
| 2013/0007836 | A1* | 1/2013 | Stevenson et al. | 726/1 |
| 2013/0247132 | A1* | 9/2013 | Dey | 726/1 |

OTHER PUBLICATIONS

Barrantes, Elena Gabriela, et al. "Randomized instruction set emulation," *ACM Transactions on Information and System Security (TISSEC)* 8.1 (2005): 3-40.

Kc, Gaurav S., et al. "Countering code-injection attacks with instruction-set randomization," *Proceedings of the 10th ACM conference on Computer and communications security*. ACM, 2003. pp. 272-280.

* cited by examiner

*Primary Examiner* — Darren B Schwartz
(74) *Attorney, Agent, or Firm* — Christie, Parker & Hale, LLP

(57) ABSTRACT

A method for detecting foreign code injected into a computer system including a processor and memory, the processor being configured to execute instructions stored in the memory, includes: detecting, on the computer system, an illegal instruction error; recording the illegal instruction error; determining whether a threshold condition is met; and generating an alert if the threshold condition is met.

16 Claims, 10 Drawing Sheets

Figure 1: Stack Smashing Buffer Overflow Attack

--Prior Art--

DETECTION OF CODE INJECTION ATTACKS

STATEMENT REGARDING FEDERALLY SPONSORED RESEARCH OR DEVELOPMENT

This invention disclosure is related to Government Contract No. FA8750-12-C-0098. The Government has certain rights in this invention.

BACKGROUND

Aspects of embodiments of the present invention relate to the field of computer security, and, more specifically, protection against code injection attacks.

FIG. 1 is a schematic diagram of a typical computer system. In a typical computer system, a central processing unit (CPU) 10 includes a program counter (PC) 12, a plurality of registers 14, an arithmetic/logic unit (ALU) 16, and a bus interface 18. The program counter 12 provides the address of the next instruction to be executed, the registers 14 store data and values currently being computed, and the ALU 16 performs computations on the data stored in the registers 14. Data is transferred into and out of the CPU 10 via the bus interface 18, which interfaces with an I/O bridge 20 to communicate with main memory 30 and other peripheral devices 40. While FIG. 1 illustrates one typical computer system, various other typical computer systems may be organized in different ways (for example, the I/O bridge 20 may be integrated into the CPU 10, or the CPU 10 may include memory caches).

FIG. 2 is a schematic diagram illustrating a stack smashing buffer overflow attack. C. Cowan, et al., *StackGuard: Automatic Adaptive Detection and Prevention of Buffer-Overflow Attacks* 7 PROC. OF USENIX SEC. SYMP. (1998). As seen in FIG. 2, the stack 100 is stored in main memory 30 and grows in a downward direction (e.g., away from 0xFFFF and toward 0x0000). When a function call is made, a "Return Address" is pushed onto the stack and space is allocated for local variables, including a potentially attackable buffer at lower addresses. When input data is stored the buffer, the data (e.g., a text string from user input) grows in an upward direction (with increasing addresses). If the size of the input data exceeds the allocated size of the buffer, data located at higher addresses than the buffer can be overwritten with the supplied data. In FIG. 2, for example, the data overflowing the buffer could overwrite the Local Variables, the return address, and portions of the stack above the return address (which is generally the portion of the stack allocated to the calling function).

As seen in FIG. 2, the overflowing buffer can be used to insert executable attack code into the stack and to overwrite the return address with a pointer to the attack code. As such, when the attacked function exits, the processor jumps to and executes the attack code instead of the function that it was called from. The attack code can be used to gain root (or administrator) access to the machine by, for example, executing the command 'exec("sh")' to produce a root shell.

Generally, stack-based code injection attacks require: knowledge of the instruction set of the underlying architecture; knowledge of the location of one or more buffers on the stack; ability to inject code/data; and ability to redirect the control flow. An attacker can use the stack to return to the injected or other arbitrary code.

In a homogeneous system (or homogenous portion of a heterogeneous system) it is easy for an attacker to craft a suitable machine code attack payload because the underlying instruction set architecture is known. Increasing the hardware diversity of a system can mitigate or overcome this problem, but this is not always a feasible option due to cost (e.g., the cost of duplicating hardware) or environmental constraints of the system in question. For example, weight or space constraints on an aircraft can limit the ability to add additional processing elements.

One existing technology to obfuscate the underlying instruction set is the use of Instruction Set Randomization (ISR). ISR randomizes the instructions in memory and then decodes the instructions before execution. This is effective in temporarily obscuring the underlying architecture, but, if the randomization value is discovered, a new attack can be crafted and injected. See, for example, Gaurav S. Kc, Angelos D. Keromytis, and Vassilis Prevelakis. *Countering Code-Injection Attacks With Instruction-Set Randomization.* 10 ACM CONF. ON COMP. AND COMM. SEC. PROC. 272 (2003) and see Elena Gabriela Barrantes, et al. Randomized Instruction Set Emulation. 8.1 ACM TRANSACTIONS ON INFO. AND SYS. SEC. (TISSEC) 3 (2005).

SUMMARY

Aspects of embodiments of the present invention are directed to systems and methods for detecting and intervening in attempted code injection attacks.

According to one embodiment of the present invention, a method for detecting foreign code injected into a computer system including a processor and memory, the processor being configured to execute instructions stored in the memory, includes: detecting, on the computer system, an illegal instruction error; recording the illegal instruction error; determining whether a threshold condition is met; and generating an alert if the threshold condition is met.

The threshold condition may include exceeding a particular number of illegal instruction errors over a particular time period.

The determining whether the threshold condition is met may include detecting a pattern using a neural network.

The threshold condition may include detecting a pattern using a Bayesian network.

The processor may be configured to execute instructions encoded in a first instruction set and the illegal instruction error may be triggered by an instruction encoded in a second instruction set different from the first instruction set.

The method may further include: loading an instruction stream, the instruction stream being encoded in the first instruction set, wherein the first instruction set is different from a native instruction set of the processor.

The method may further include: loading a plurality of instruction streams, each of the plurality of instruction streams being equivalent and being encoded in a different instruction set of a plurality of instruction sets; executing, in a context, a first stream of the plurality of instruction streams; stopping execution of the first stream at a first location of the first stream; and executing, in the context, a second stream of the plurality of instruction streams at a second location of the second stream, the second location corresponding to the first location of the first stream, wherein the first stream and the second stream are encoded in instruction sets different from the second instruction set.

Generating the alert may include sending an email message or a text message.

The method may further include shutting down the computer system when the threshold condition is met.

According to one embodiment of the present invention, a computer system includes a processor and memory storing program instructions, the computer system being configured to execute instructions stored in the memory, the computer system being configured to: detect an illegal instruction error; record the illegal instruction error; determine whether a threshold condition is met; and generate an alert if the threshold condition is met.

The threshold condition may include exceeding a particular number of illegal instruction errors over a particular time period.

The computer system may be configured to determine whether the threshold condition is met by detecting a pattern using a neural network.

The computer system may be configured to determine whether the threshold condition is met by detecting a pattern using a Bayesian network.

The computer system may be further configured to execute instructions encoded in a first instruction set and the illegal instruction error may be triggered by an instruction encoded in a second instruction set different from the first instruction set.

The may be further configured to load an instruction stream, the instruction stream being encoded in the first instruction set, wherein the first instruction set is different from a native instruction set of the processor.

The computer system may be further configured to: load a plurality of instruction streams, each of the plurality of instruction streams being equivalent and being encoded in a different instruction set of a plurality of instruction sets; execute, in a context, a first stream of the plurality of instruction streams; stop execution of the first stream at a first location of the first stream; and execute, in the context, a second stream of the plurality of instruction streams at a second location of the second stream, the second location corresponding to the first location of the first stream, wherein the first stream and the second stream are encoded in instruction sets different from the second instruction set.

The may be configured to generate the alert by sending an email message or a text message.

The computer system may be further configured to shut down the computer system when the threshold condition is met.

According to one embodiment of the present invention, a non-transitory computer readable medium embodies program instructions for execution by a data processing apparatus, the program instructions the processing apparatus for: detecting, on the data processing apparatus, an illegal instruction error; recording the illegal instruction error; determining whether a threshold condition is met; and generating an alert if the threshold condition is met.

The program instructions may further adapt the processing apparatus for: loading a plurality of instruction streams, each of the plurality of instruction streams being equivalent and being encoded in a different instruction set of a plurality of instruction sets; executing, in a context, a first stream of the plurality of instruction streams; stopping execution of the first stream at a first location of the first stream; and executing, in the context, a second stream of the plurality of instruction streams at a second location of the second stream, the second location corresponding to the first location of the first stream, wherein the illegal instruction error is triggered by a program instruction encoded in a first instruction set, the first instruction set being different from the instruction sets of the first stream and the second stream.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
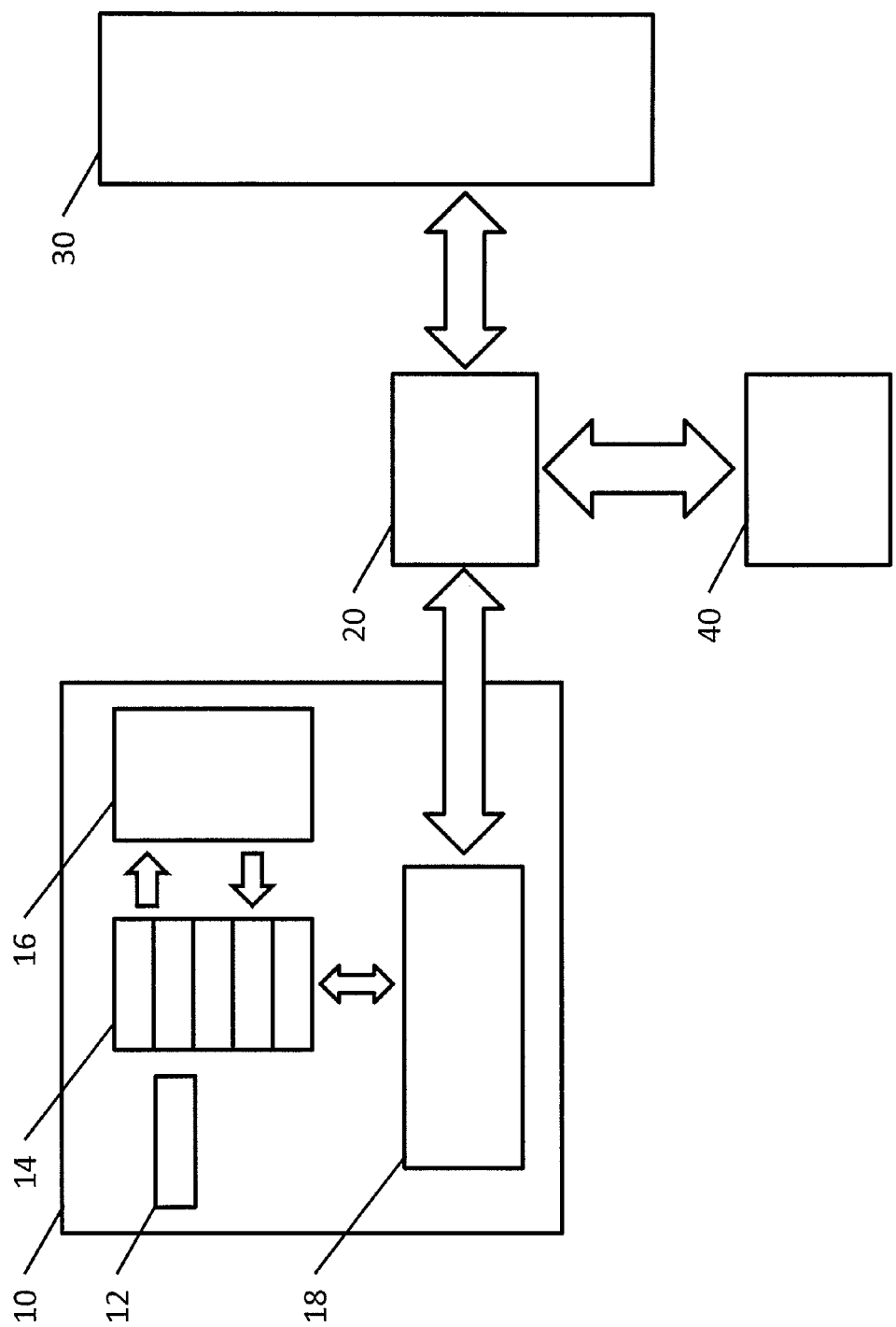
FIG. 1 is a schematic diagram of a typical computer system.
Figure 2:
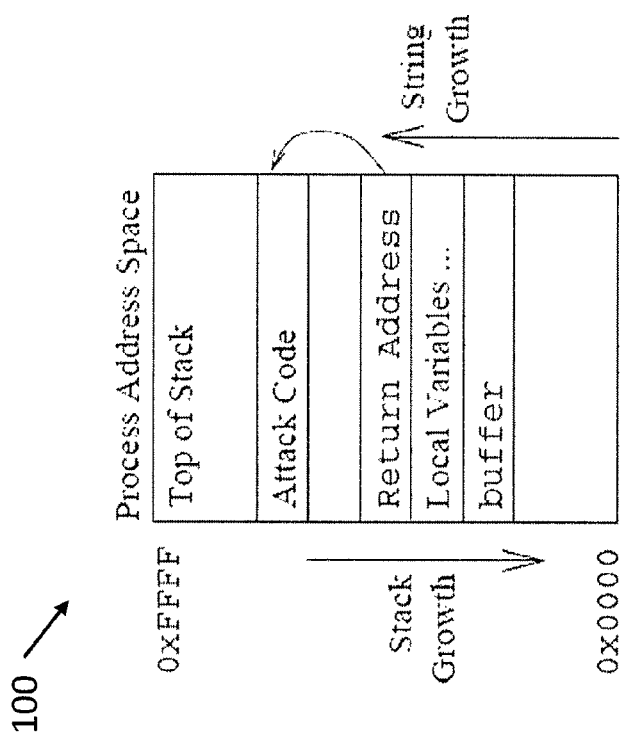
FIG. 2 is a schematic diagram illustrating a stack smashing buffer overflow attack.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Embodiments of the present invention are directed to methods, systems, and computer programs for improving the security of a computer system against machine code injection attacks by detecting the injection attacks.

Generally, when a processor encounters an illegal instruction, currently-running program typically crashes and a severe, un-maskable error is generated by the processor (e.g., an "illegal instruction" error or "data abort" exception). For the sake of convenience, the term "illegal instruction error" will be used to refer to any type of error or exception state or condition triggered by an attempt to execute an invalid instruction.

An attempted machine code injection attack in which code in the incorrect architecture (or instruction set) will typically trigger the illegal instruction error. Such errors will typically occur more frequently in systems that operate using an instruction set different from the instruction set expected by the attacker. Embodiments of the present invention provide a robust attack detection mechanism by catching and analyzing these errors.

Figure 3:
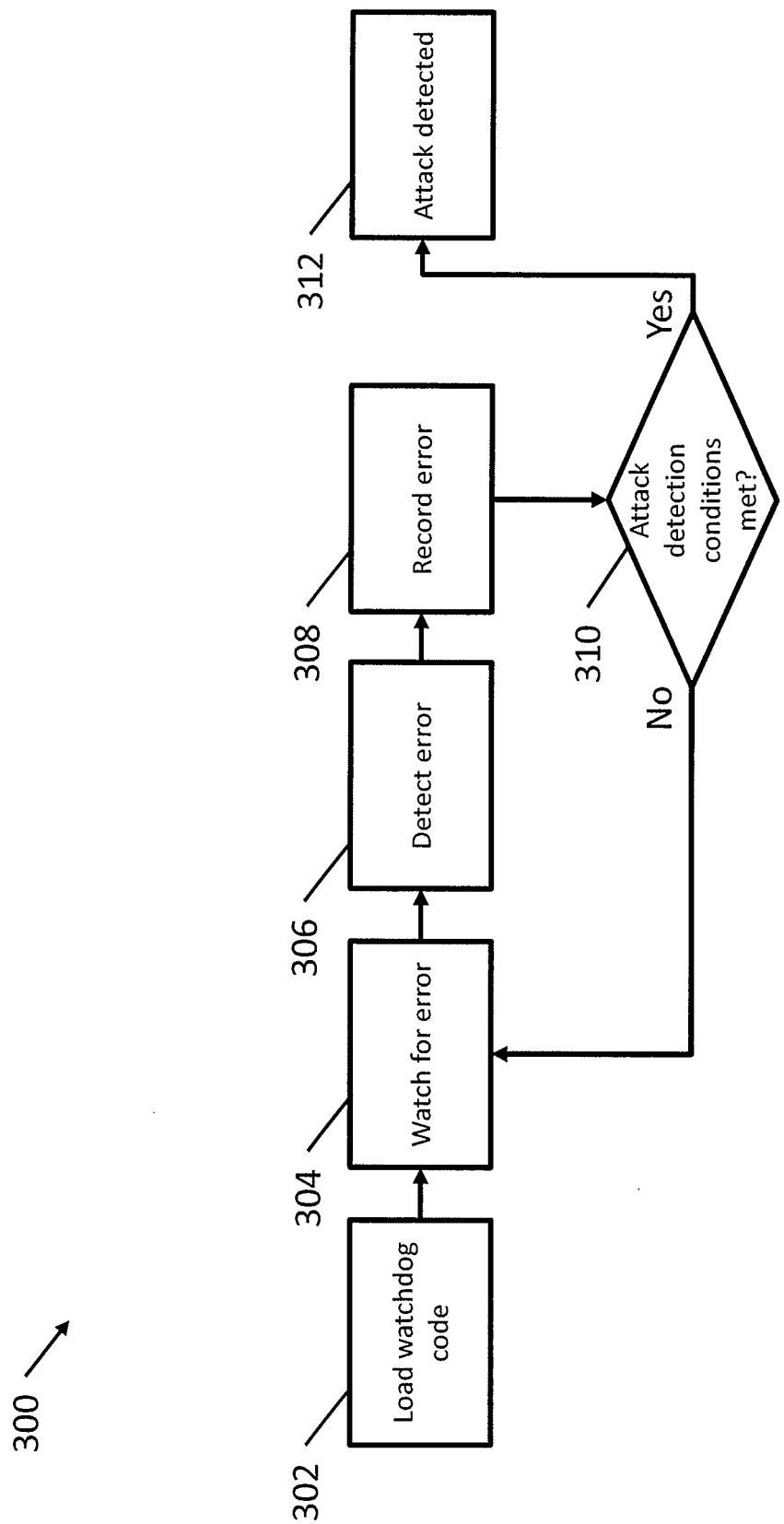
FIG. 3 is a process flow diagram illustrating a method of detecting code injection attacks according to one embodiment of the present invention.

FIG. 3 is a flowchart illustrating a method of detecting a code injection attack according to one embodiment of the present invention. Referring to FIG. 3, the method 300 loads a watchdog process in operation 302. According to one embodiment of the present invention, the watchdog process is a process within the operating system capable of detecting when error codes are triggered by another process running on the processor. According to another embodiment of the present invention, the watchdog process is implemented as a component (e.g., a plug-in) of a platform virtual machine such as a hypervisor or other software emulating underlying hardware such as Bochs, Oracle® VirtualBox®, QEMU, or VMware®). In another embodiment of the present invention, the watchdog process may be implemented in an application virtual machine (e.g., a process level virtual machine such as a Java Virtual Machine, Low Level Virtual Machine, and Microsoft® Common Language Infrastructure).

In operation 304, the watchdog process monitors error codes returned by the processor or the emulated processor of the virtualized machine. When the watchdog process detects an error (such as an illegal instruction error or a data abort exception) in operation 306, the error is recorded in operation 308 and the watchdog process determines in operation 310 if conditions have been met for there to determine whether an attack appears to be in progress.

The conditions can be specified using a variety of techniques well known to one of ordinary skill in the art. Illegal instruction errors can also occur naturally, due, for example, to random hardware errors related to aging components or cosmic rays. Therefore, the watchdog process also considers the time span over which the events occur. For example, the watchdog process could consider the number of such errors that have occurred over a specified time period (e.g., more than one hundred illegal instruction errors over the past five minutes), the number of data fetches (e.g., requests for instructions from portions of memory allocated for data storage) over a period of time, detecting patterns of multiple attacks clustered together, or patterns detected using a trained neural network, Bayesian network, or other learning algorithm. In various embodiments of the present invention, these parameters are configurable to allow increased flexibility and adaptability to the operating characteristics of various programs and based on the type of environment that the system operates in (e.g., mission critical systems may have a lower tolerance, while general purpose systems may have a higher tolerance).

If the conditions for detecting an attack are not triggered, then the method returns to the monitoring operation 304.

If the conditions are met and an attack is detected, then in operation 312 the watchdog process initiates processes to respond to the attack. Responses to attack may include, for example, preventing the software that was the target of the attack from automatically restarting, reporting the attack to a user (e.g., via an on-screen display, email, or text message), and shutting down the attacked machine (or virtual machine).

Figure 4:
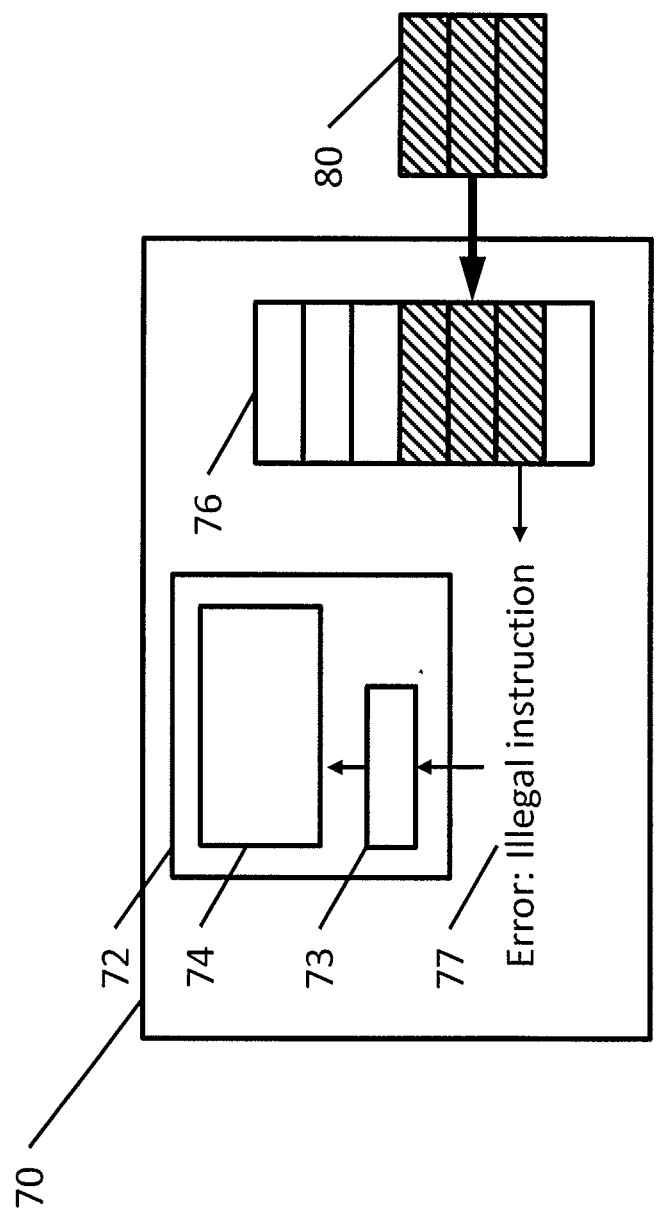
FIG. 4 illustrates the operation of a watchdog process within a system according to one embodiment of the present invention.

FIG. 4 illustrates the operation of a watchdog process within a system according to one embodiment of the present invention. Referring to FIG. 4, a system 70 (e.g., a platform virtual machine) is configured to execute a watchdog process 72, which includes the watchdog program 73 and memory 74 allocated to the watchdog program 73. The system 70 is configured to execute a target program 76, which may be subject to a code injection attack. The target program may include, but is not limited to, a web server, a database server, a caching service, an email server, etc.

An attacker may attempt to inject attack code 80 into the system, which may overwrite portions of the data or code associated with target program 76. When the attack code 80 is executed, it may generate an illegal instruction error 77, which causes the underlying processor 10 that is executing the code to generate an error such as an illegal instruction error or a data abort error. This error is caught by the watchdog process 72, which stores the information about the error in memory 74 and which compares the error to historical data or other models stored in memory 74 to determine whether an attack appears to be in progress.

In other embodiments of the present invention, the watchdog process may be implemented as a component of an operating system. Generally, exceptions handing handled as part of the operating system, so in some embodiments of the present invention, the watchdog process functionality is added to the operating system as a kernel module that handles watching for exceptions and triggering responses when attacks are detected.

Generally, embodiments of the present invention are more effective on systems that operate using an instruction set different from the instruction set of the injected attack code (e.g., different from the instruction set expected by the attacker), thereby increasing the likelihood that the injected attack code will trigger an illegal instruction error. Such systems include computer systems using atypical architectures (e.g., ARM or SPARC as opposed to the more common x86 architecture), systems having increased physical diversity (e.g., multiple processors having different architectures), or synthetic processing diversity (e.g., via instruction set randomization as described above or using synthetic processing diversity as described in, for example, U.S. patent application Ser. No. 13/939,061 "SYNTHETIC PROCESSING DIVERSITY WITH MULTIPLE ARCHITECTURES WITHIN A HOMOGENEOUS PROCESSING ENVIRONMENT", filed in the U.S. Patent and Trademark Office on Jul. 10, 2013, the entire disclosure of which is incorporated herein by reference).

In more detail, embodiments of the present invention may create synthetic diversity to increase the likelihood of triggering an illegal instruction by providing to a processor an instruction stream randomly selected from a plurality of equivalent instruction streams. A new instruction stream from the plurality of equivalent instruction streams can be selected and switched (or shifted) to at any interval, down to the instruction-by-instruction level (e.g., switching between instruction streams after each instruction in executed).

Figure 5:
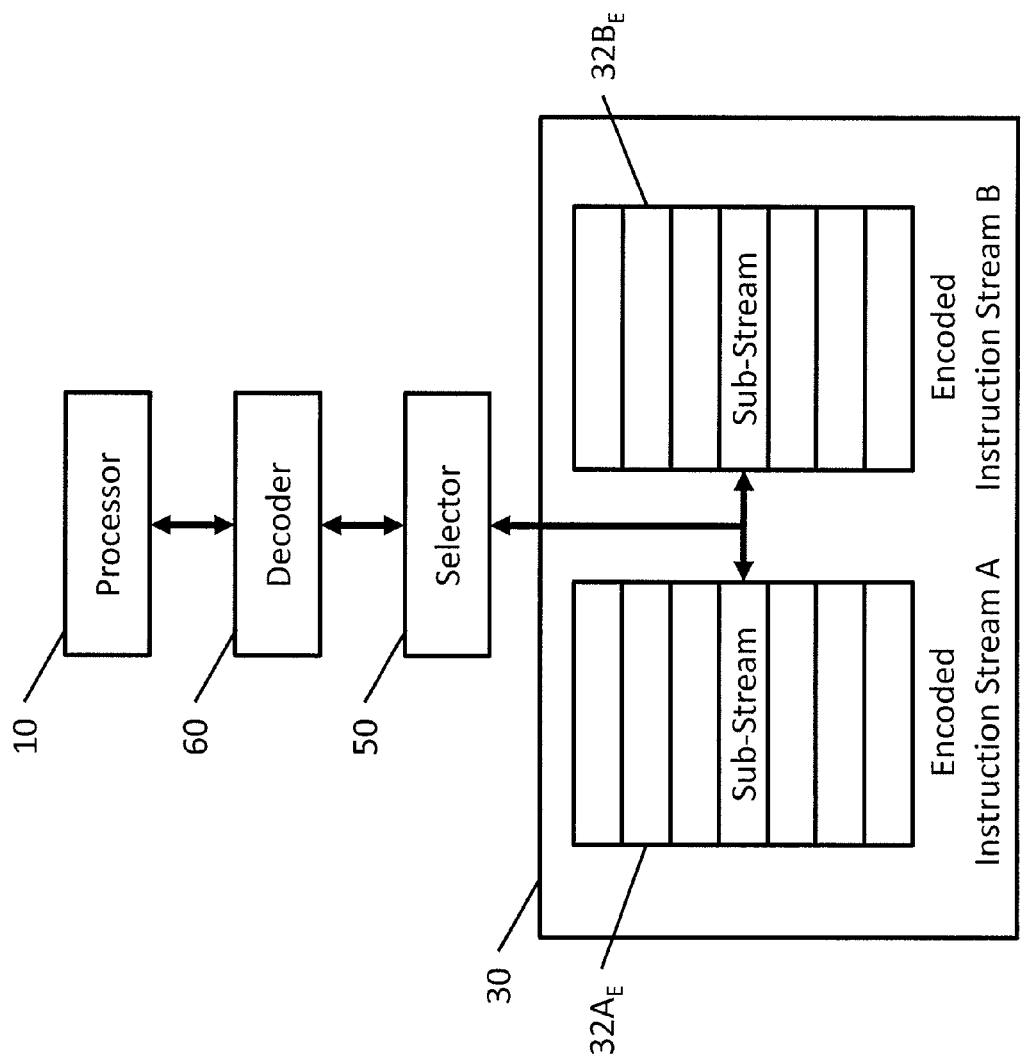
FIG. 5 is a schematic diagram illustrating a system configured to switch between encoded instruction streams according to one embodiment of the present invention.

FIG. 5 is a schematic diagram illustrating a system configured to switch between encoded instruction streams according to one embodiment of the present invention. Referring to FIG. 5, in one embodiment, when a program is loaded into memory, multiple copies of the instructions are stored, each of the instruction streams being encoded differently (e.g., using a different encoding key or salt). As such, each instruction stream is essentially encoded using a different instruction set. In addition, the instruction streams are encoded in instruction sets that are different from the native instruction set of the processor 10. The processor 10 is coupled to an instruction stream selector 50, which selects between Encoded Instruction Stream A and Encoded Instruction Stream B. Decoder 60 is placed between the selector 50 and the processor to decode the encoded instructions from the encoded instruction streams $32A_E$ and $32B_E$ before execution by the processor 10 by performing a decoding operation between the encoded data and its corresponding encoding key. These equivalent instruction streams share the same context (e.g., registers, stack, and heap). In other words, the context is controlled by the instruction stream selector 50, which gives control of the context to the selected instruction stream.

The encoding process can be any function that modifies an instruction and that is capable of restoring it to the original instruction during decoding. The encoder may be, for example, an XOR operation or a symmetric encryption operation such as Twofish, AES, RC4, or 3DES.

For example, instruction stream $I_O$ can be encoded by preforming the encoding operation (e.g., XOR or a symmetric encryption operation) between each instruction in $I_O$ and with a first encoding key $K_A$ to generate a first encoded instruction stream A 32$A_E$ and by performing the encoding operation between each instruction in $I_O$ and a second encoding key $K_B$ to generate a second encoded instruction stream B 32$B_E$. In one embodiment the encoding keys are generated using a hardware or software random number generator.

Injecting multiple equivalent instructions streams and alternating between the instruction streams (possibly at random) provides increased architectural diversity on a single processor system because the attacker cannot be predict or depend upon any assumptions about which instruction stream will be running at a given time, let alone instruction set is being executed (e.g., native code that is injected into the system will be "decoded" by the decoder 60 into commands that are unlikely to be effective). Although code injection is not prevented (e.g., because buffer-overflow attacks can still introduce attack code into the system), the ability of an attacker to successfully gain control of the system using code injection is limited.

Referring to FIG. 5, in one embodiment of the present invention, the instruction selector 50 is located between a processor and its instruction stream(s). Functionally, the instruction selector 50 selects from a set of instruction streams (e.g., instruction stream A 32A and instruction stream B 32B). The selection mechanism is random and can occur at any desired interval (e.g., after each instruction, after each block of instructions, after a time interval, or after a number of clock cycles). In various embodiments of the present invention, the instruction streams may be formatted or include instructions from any instruction set, as long as the formatting and the instructions are valid and can be interpreted by the processor.

Figure 6:
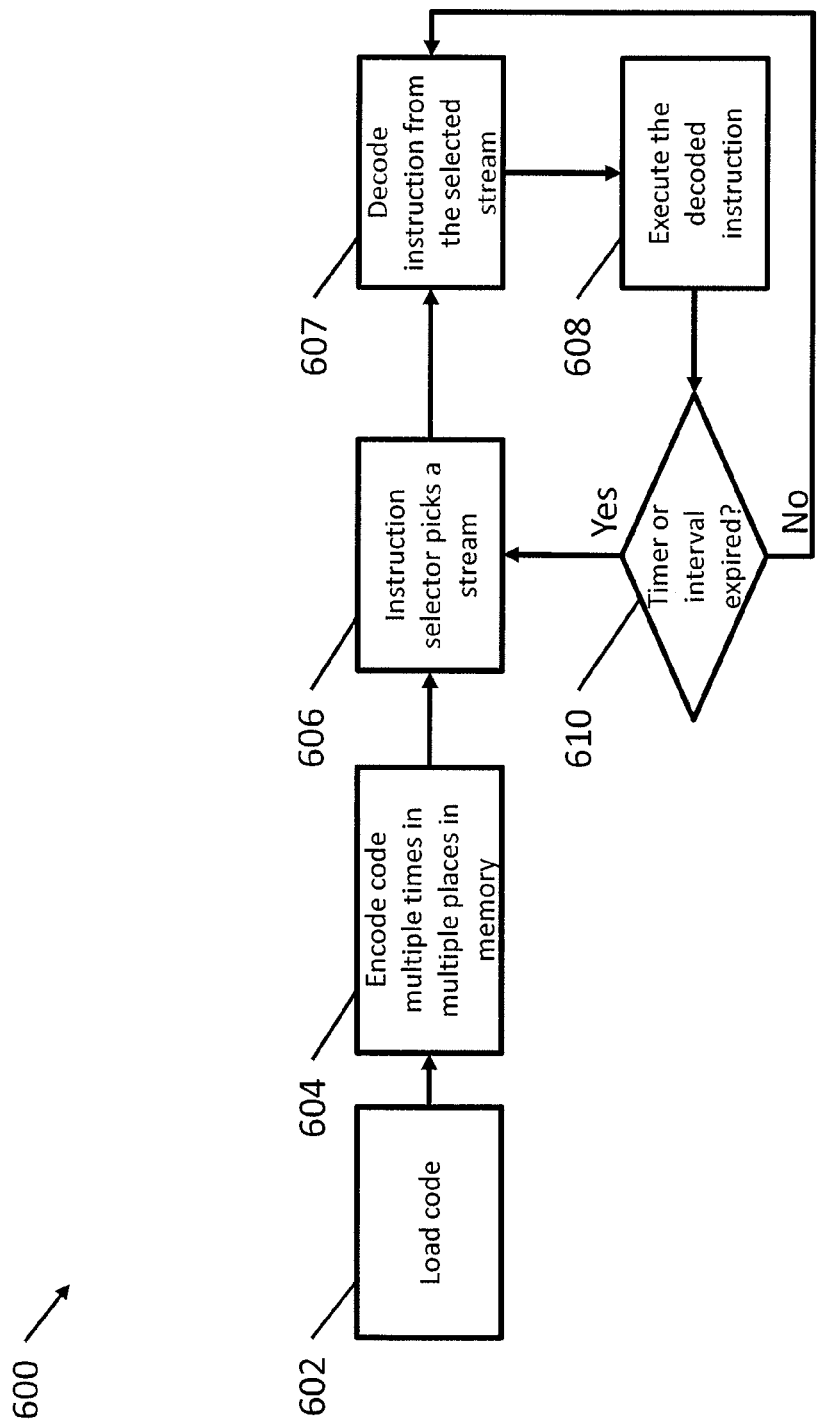
FIG. 6 is a process flow diagram illustrating a method of loading of providing synthetic processing diversity with encoded instruction streams according to one embodiment of the present invention.

FIG. 6 is a process flow diagram illustrating a method of providing synthetic processing diversity with encoded instruction streams according to one embodiment of the present invention. In operation 602, code (or a set of instructions) is loaded from a binary. In operation 604, multiple copies of the code are encoded (e.g., each with a different encoding key) and each encoded copy is placed in a different place in memory 30 (e.g., by a modified version of an application loader such as the 'execve' function in Unix/Linux). As such, each encoded copy of the code is encoded using a different instruction set or architecture. In operation 606, the instruction selector 50 selects one of the encoded instruction streams. Encoded instructions from the selected instruction streams are decoded in operation 607, and the decoded instructions are executed in operation 608. This process of decoding instructions and executing the decoded instructions continues until a timer or interval expires in operation 610, point the instruction selector selects another encoded stream in operation 606.

According to one embodiment of the present invention, the selector 50 and/or the decoder 60 are implemented in software by emulating the computer architecture. For example, the selector 50 and decoder 60 may be implemented in a platform virtual machine (e.g., a hypervisor or other software emulating underlying hardware such as Bochs, Oracle® VirtualBox®, QEMU, or VMware®). In another embodiment of the present invention, the loading and selection of instruction streams may be implemented in an application virtual machine (e.g., a process level virtual machine such as a Java Virtual Machine, Low Level Virtual Machine, and Microsoft® Common Language Infrastructure).

The following C code illustrates a method of encoding and allocating multiple instruction streams into memory according to one embodiment of the present invention as implemented in software (e.g., in a hypervisor):

TABLE 1

```
// Number of instructions streams to produce
int ENCODE_ROUNDS;
// The encode values of each instruction stream
unsigned int ENCODE_VALUES[ ];
// Pointers to each encode text section
void* TEXT_SECTIONS[ ];
// This function will replace the emulators target mmap function, which is
// responsible for placing a data or text section into memory
void* target_mmap(void* start_section, int sizeBytes, Type mmapType)
{
  // Address where the data/text was loaded
  void* loadAddress = NULL;
  // Buffer for performing the encoding
  unsigned char* encodeBuffer =NULL;
  // Only text sections are encoded and duplicated
  if(mmapType == EXECEUTABLE_CODE)
  {
    // Allocate memory for the encode buffer
    encodeBuffer = malloc(sizeBytes);
    // Create the multiple instruction streams
    for(int round = 0; round < ENCODE_ROUNDS; round++)
    {
      // Chose a random encoding value
      ENCODE_VALUES [round] = rand ( );
      // Encode the text section
      encode(encodeBuffer, start_section, sizeBytes, ENCODE_VALUES[round]);
      // mmap the encoded text section
      loadAddress = original_target_mmap(encodeBuffer, sizeBytes, mmapType);
```

TABLE 1-continued

```
        // Add the text section to the set of possible streams
        TEXT_SECTIONS[round] = loadAddress;
    }
    free encodeBuffer;
  }
  else
  {
    // For data sections, call the orginal mmap
    loadAddress = original_target_mmap(start_section, sizeBytes, mmapType);
  }
  return loadAddress;
}
```

In the embodiment shown in Table 1, the above source code is added to existing virtual machine software and the target_mmap( ) function is used to intercept any calls that are made to mmap (a memory mapping function that is used to allocate memory for code and data). This target_mmap( ) function checks to see if instructions are being mapped, and if they are, creates multiple encoded copies of the instructions. The locations of these text sections and their corresponding encode values (or encode keys) are recorded in the TEXT_SECTIONS[ ] and ENCODE_VALUES[ ] arrays for use later when the instructions are decoded and executed. Any data mappings that occur are passed through to the original mmap function, original_target_mmap( ).

The following C code illustrates a method of selecting, decoding, and executing an instruction stream from the multiple instruction streams according to one embodiment of the present invention as implemented in software (e.g., in a hypervisor):

TABLE 2

```
// Number of instructions streams to produce
int ENCODE_ROUNDS;
// The encode values of each instruction stream
unsigned int ENCODE_VALUES[ ];
// Pointers to each encode text section
void* TEXT_SECTIONS[ ];
// Disassemble a single instruction
void disassemble_instruction(void* programCounter)
{
  unsigned int encodedinstruction = 0;
  unsigned int decodedInstruction = 0;
  // Select a random stream
  int streamNumner = rand(ENCODE_ROUNDS);
  // Get the current instruction in this stream. In this case the PC is
  // relative to the start of the tet section
  encodedinstruction = TEXT_SECTIONS[streamNumner] + programCounter;
  // Decode the instruction
  decodedInstruction = decode_instruction(encodedinstruction,
                                    ENCODE_VALUES[streamNumner]);
  // Translate the decoded instruction
  translate(decodedInstruction);
}
```

In the embodiment shown in Table 2, the listed code is added to the disassemble instruction function of existing virtual machine software. The encoded instruction is selected randomly from one of the available text sections, and then decoded with the associated encode value (or encode key). The decoded instruction is then translated and executed as it normally would.

Figure 7:
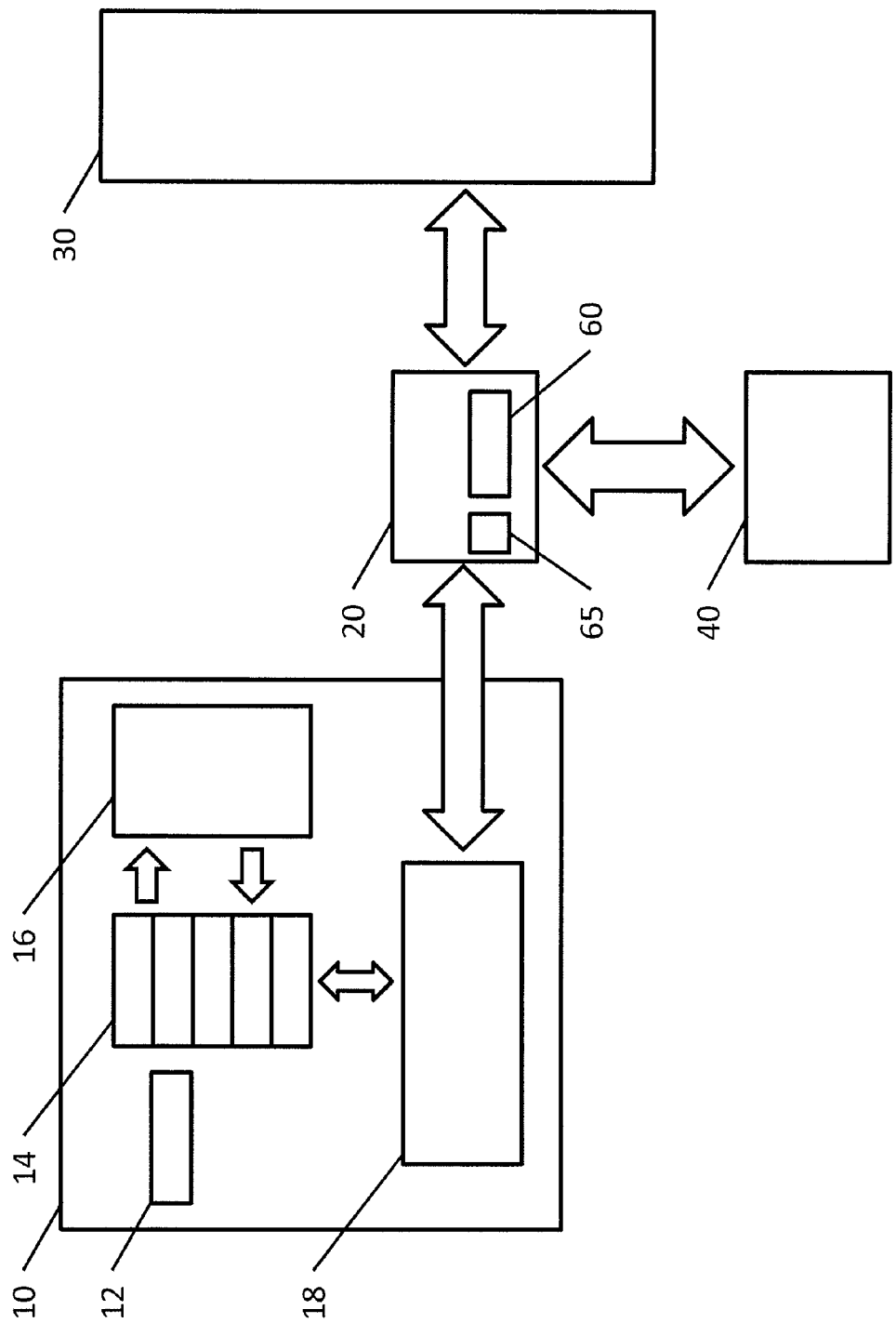
FIG. 7 is a schematic diagram of a computer system including a hardware instruction decoder in accordance with one embodiment of the present invention.
Figure 8:
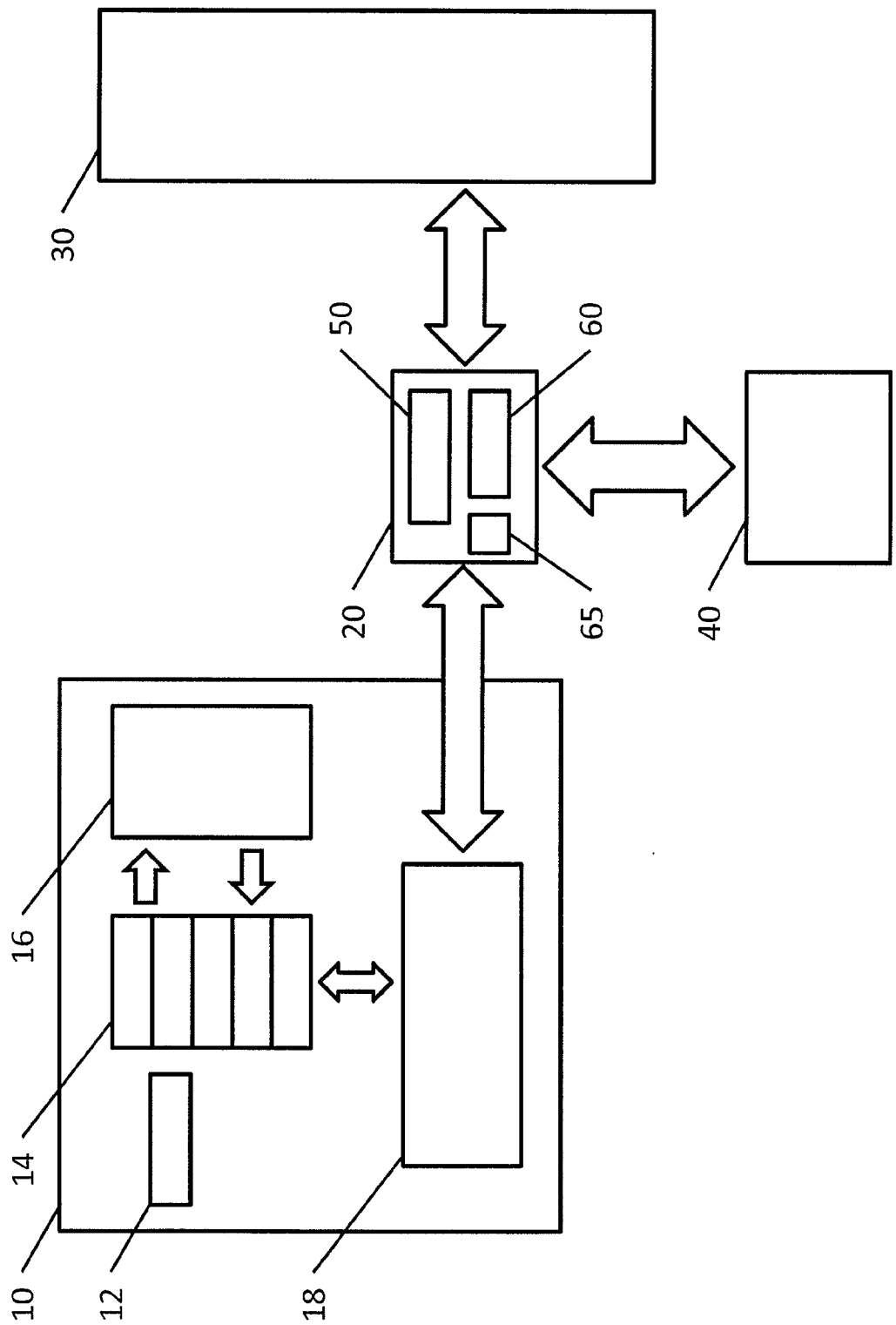
FIG. 8 is a schematic diagram of a computer system including a hardware instruction selector and a hardware instructor decoder in accordance with one embodiment of the present invention.

FIG. 7 is a schematic diagram of a computer system including a hardware instruction decoder 60 in accordance with one embodiment of the present invention. FIG. 8 is a schematic diagram of a computer system including a hardware instruction selector 50 and a hardware instructor decoder 60 in accordance with one embodiment of the present invention. In some embodiments, the selector 50 and/or the decoder 60 are implemented using application specific hardware located in the path between the processor and the memory 30, such as within the I/O bridge 20. However, embodiments of the present invention are not limited thereto and the selector 50 and/or the decoder 60 may be located anywhere along the path between the CPU and the memory 30.

Referring to FIG. 7, according to one embodiment of the present invention with a hardware based decoder 60, a modified application loader creates multiple copies of an application as it is loaded (as described above with respect to FIGS. 5 and 6. These copies are loaded into different locations in memory 30. Each of these locations has a "base" address that is recorded as the location of the corresponding instruction stream along with a possible decoding key. When the application runs, a kernel module performs the selection of an instruction stream (e.g., the kernel module acts as the selector 50). When a selection occurs, the module updates the memory management unit (MMU) to point to the location of the newly selected instruction stream and loads the corresponding decode value into the hardware decoder 60 so that the hardware decoder can decode the instructions retrieved from the newly selected stream.

In some embodiments of the present invention, the watchdog process is implemented in hardware located on the same bus or in series with the processor (or CPU) 10. For example, in some embodiments, a detector 65 is connected to the decoder 60 and determines if the decoded instruction was valid or not. In some embodiments of the present invention, the detector 65 is also configured to detect invalid data fetches (e.g., requests for instructions from portions of memory allocated for storing data).

Referring to FIG. 8, in other embodiments of the present invention, the selector 50 is also implemented in hardware, and would likely be located in the same place as the hardware decoder 60. The hardware instruction selector 50 stores the base addresses of the instruction streams that were loaded into memory and includes some logic to determine when to switch between instruction streams (e.g., a hardware timer or an instruction counter).

In one embodiment of the present invention an FPGA configured to implement the selector 50 is placed between the CPU 10 and memory 30. The FPGA includes registers to store the addresses of the different instruction streams 32 stored in memory 30. When a request to read an instruction is received from the CPU 10, the selector 50 translates the read instruction into a request to read instructions from the selected stream by modifying the memory address to be read in accordance with the address of the stream stored in the registers. The selector would then forward that read on to memory 30 to read the currently selected stream.

In embodiments in which encoded instruction streams are used, the FPGA further includes registers for storing the encoding keys corresponding to the instruction streams and a decoder 60 configured to decode, using the stored encoding keys, the instruction received from the memory 30 before the instruction is sent to the CPU 10.

In other embodiments, the registers, the selector 50, and the decoder 60 are integrated into a CPU or a memory controller and configured to function in a substantially similar way, wherein the selector 50 is configured to intercept accesses to memory to be sent over the bus by redirecting those requests to one of the instruction streams.

Although various components of the selector 50 and the decoder 60 are described herein as being implemented in software or hardware, one of skill in the art would understand that various components and functionality could be implemented in software, hardware, firmware, and combinations thereof.

The following discussion provides a mathematical and experimental analysis of the effectiveness of synthetic processing diversity using multiple instruction sets as described above.

Generally, the likelihood of success of an attack decreases as the number of architectures (or instruction sets) increases. In a system in which an architecture is randomly selected from a plurality of architectures at application startup or when the machine is booted and under conditions in which the attacker knows the set of all possible architectures that the system could select from, the average number of attempts until a successful breach is equal to the number of architectures. As such, the likelihood of a successful attack is the inversely proportional to the number of architectures. Mathematically, the inverse relationship corresponds to a geometric distribution because each of the attack attempts can be viewed as a Bernoulli trial.

Given that x is the attempt the attack will be successful and p is the probability of success of an attack (fixed for a given set of architectures):

$$x = \text{geometric}(p) \quad (1)$$

As x is geometric, the probability that the $k^{th}$ trial is successful is given as:

$$P(x=k) = (1-p)^{k-1} \times p \quad (2)$$

In addition, the expected value of a geometric distribution is given as:

$$E(x) = \frac{1}{p} \quad (3)$$

However, p is known (as discussed above, p=# of architectures$^{-1}$, so equation (3) reduces to:

$$E(x) = \frac{1}{\text{\# of architectures}^{-1}} = \text{\# of architectures} \quad (4)$$

Figure 9:
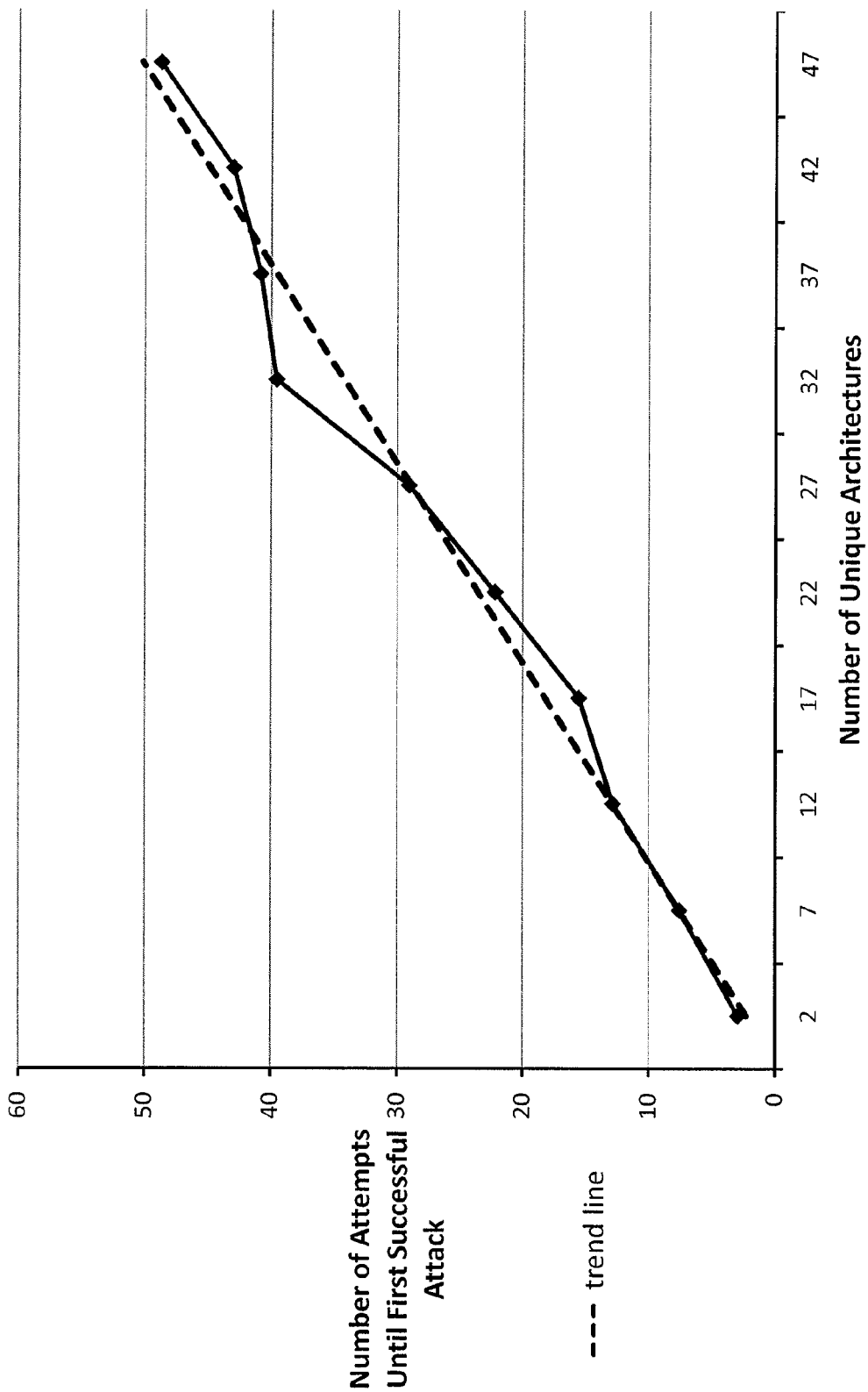
FIG. 9 is a graph of experimental data illustrating the number of attempts until a successful attack against the number of unique architectures in a computer system configured to randomly select one of the unique architectures.

To test this hypothesis, code injection attacks were performed against a virtual machine running within QEMU. In the experiments, the virtual machine was configured to select one of a plurality of unique architectures for each run. FIG. 9 plots these experimental results as the number of attempts until the first successful attack against the number of unique architectures in the virtual machine.

The graph shown in FIG. 9 agrees with what would be predicted by the results of the statistical analysis, as given in equations (2) and (5). However, these numbers assume that no action is taken by the system operator when these attacks fail. In embodiments of the present invention, when an attack fails, an invalid instruction alert can be displayed to the system operator (e.g., in an alert sent as a message popup on a display, as a notification on a mobile device, as an email alert, etc.) if the watchdog process detects an attack. Given the severity of instruction-level errors it is likely that a system operator (or security monitoring software/hardware) would recognize the incoming attacks and respond. In addition, the watchdog process may be configured to take preventative measures (e.g., lock down the system and/or prevent access to the system) after N unsuccessful attacks. As such, the probability that an attack is prevented can be expressed as:

$$P(\text{Attack prevented}) = 1 - \sum_{0}^{N} P(x=i) \quad (6)$$

Equation (6) is using the geometric probably for each trial from (2). The watchdog approach was implemented in the experimental system for a number of 2 up to 47 architectures, with 25 runs experimental runs per data point and the results of the experiments are shown in FIG. 10.

Figure 10:
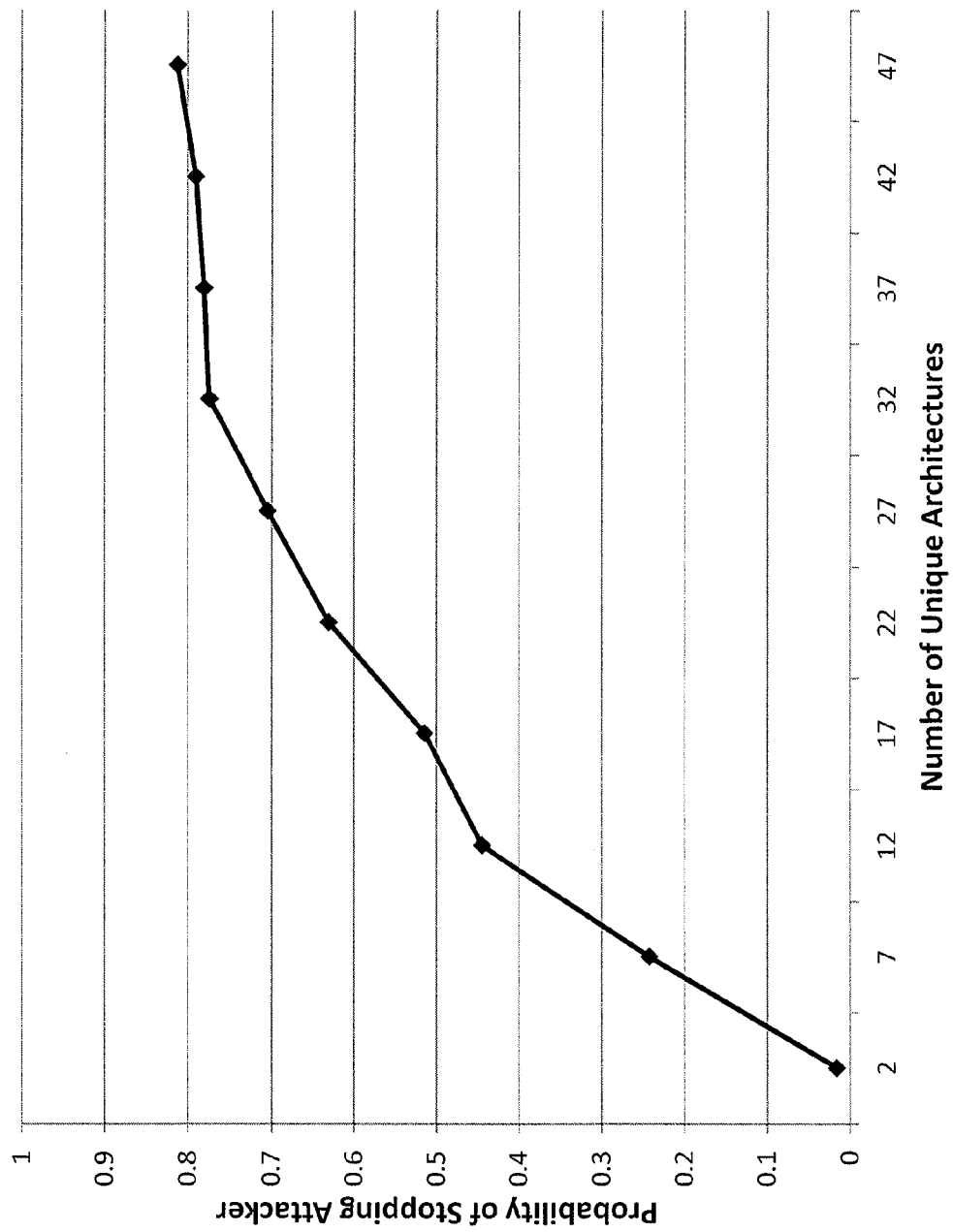
FIG. 10 is a graph comparing the probability of stopping an attacker in a prior art system operating in only a single architecture against the probability of stopping an attacker in systems according to embodiments of the present invention in which two to five architectures are selected from and shifted between during execution.

FIG. 10 illustrates the measured probability of preventing attack using a watchdog process for a given number of architectures as determined by from the watchdog runs. Once the number of architectures reaches 30, the odds for successfully stopping an attack begin to plateau at around 80% and additional architectures only marginally increase that percentage. The statistical analysis assumes a worst-case scenario; the attacker is aware of the set of architectures that could possibly be run, and that attack payload that will be used only needs to run in a single architecture.

However, in other embodiments of the present invention in which the architecture being executed switched during attack payload execution (e.g., when using multiple physical or synthetic architectures), then the attacker would also need to be aware of the change and construct the payload accordingly (e.g., such that the instruction set architecture of the injected code would need to switch at an appropriate time), thereby further increasing the likelihood of triggering an illegal instruction error.

As described above, the probability that an attacker will successfully guess the correct architecture (using a single architecture payload) is simply the inverse of the number of architectures. When multiple architectures are required for the payload in the context of architecture shifting, the probability of successful breach can be expressed as:

$$p = \frac{1}{a^r} \quad (5)$$

Where a is the number of possible architectures, and r is the number of architectures required in the payload (or the number of shifts performed by the system during execution). The below statistical analysis again assumes the worst case scenario that the attacker knows the set of all possible architectures.

Embodiments of the present invention provide various advantages over the conventional art. Because the detection process utilizes a core system error that cannot be turned off by operating system level settings, system administrators and attackers cannot deactivate the underlying feature (e.g., a system administrator may deactivate security features for performance or compatibility reasons). In addition, minimal additional overhead is incurred when running on systems that already utilize diversity techniques. Furthermore, the detection process can be configured for various types of running conditions, e.g., to be more tolerant or less tolerant of errors in the system.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof

What is claimed is:

1. A method for detecting foreign code injected into a computer program executed by a heterogeneous computer system comprising a plurality of different processors each with different architecture and different native instruction set, and memory, the plurality of different processors being configured to execute instructions stored in the memory, the method comprising:
   executing a first portion of the computer program by a first processor having a first architecture and a first instruction set;
   executing a second portion of the computer program by a second processor having a second architecture and a second instruction set different than the first instruction set;
   detecting, on the heterogeneous computer system, an illegal instruction error;
   recording the illegal instruction error;
   determining whether a threshold condition for an attack on the heterogeneous computer system is met based on patterns of multiple previous attacks clustered together and the number of different architectures; and
   generating an alert if the threshold condition for the attack on the heterogeneous computer system is met, wherein the illegal instruction error is triggered by an instruction encoded in a third instruction set different from the first and second instruction sets.

2. The method of claim 1, wherein the threshold condition further comprises exceeding a particular number of illegal instruction errors over a particular time period.

3. The method of claim 1, wherein determining whether the threshold condition is met comprises detecting the patterns using a neural network.

4. The method of claim 1, wherein the threshold condition comprises detecting the patterns using a Bayesian network.

5. The method of claim 1, further comprising:
   loading a plurality of instruction streams, each of the plurality of instruction streams being equivalent and being encoded in a different instruction set of a plurality of instruction sets;
   executing, in a context, a first stream of the plurality of instruction streams;
   stopping execution of the first stream at a first location of the first stream; and
   executing, in the context, a second stream of the plurality of instruction streams at a second location of the second stream, the second location corresponding to the first location of the first stream,
   wherein the first stream and the second stream are encoded in instruction sets different from the second instruction set.

6. The method of claim 1, wherein generating the alert comprises sending an email message or a text message.

7. The method of claim 1, further comprising shutting down the computer system when the threshold condition is met.

8. A computer system comprising a plurality of different processors each with different architecture and different native instruction set, and memory storing program instructions, the computer system being configured to execute instructions stored in the memory, the computer system being configured to:
   execute a first portion of the computer program by a first processor having a first architecture and a first instruction set;
   execute a second portion of the computer program by a second processor having a second architecture and a second instruction set different than the first instruction set;
   detect an illegal instruction error;
   record the illegal instruction error;
   determine whether a threshold condition for an attack on the heterogeneous computer system is met based on patterns of multiple previous attacks clustered together and the number of different architectures; and
   generate an alert if the threshold condition for the attack on the heterogeneous computer system is met, wherein the illegal instruction error is triggered by an instruction encoded in a third instruction set different from the first and second instruction sets.

9. The computer system of claim 8, wherein the threshold condition further comprises exceeding a particular number of illegal instruction errors over a particular time period.

10. The computer system of claim 8, wherein the computer system is configured to determine whether the threshold condition is met by detecting the patterns using a neural network.

11. The computer system of claim 8, wherein the computer system is configured to determine whether the threshold condition is met by detecting the patterns using a Bayesian network.

12. The computer system of claim 8, wherein the computer system is further configured to:

load a plurality of instruction streams, each of the plurality of instruction streams being equivalent and being encoded in a different instruction set of a plurality of instruction sets;

execute, in a context, a first stream of the plurality of instruction streams;

stop execution of the first stream at a first location of the first stream; and execute, in the context, a second stream of the plurality of instruction streams at a second location of the second stream, the second location corresponding to the first location of the first stream, wherein the first stream and the second stream are encoded in instruction sets different from the second instruction set.

13. The computer system of claim 8, wherein the computer system is configured to generate the alert by sending an email message or a text message.

14. The computer system of claim 8, wherein the computer system is further configured to shut down the computer system when the threshold condition is met.

15. A non-transitory computer readable medium embodying program instructions for execution by a heterogeneous computer system, the program instructions adapting the heterogeneous computer system for:

executing a first portion of the computer program by a first processor having a first architecture and a first instruction set;

executing a second portion of the computer program by a second processor having a second architecture and a second instruction set different than the first instruction set;

detecting, on the heterogeneous computer system, an illegal instruction error; recording the illegal instruction error;

determining whether a threshold condition for an attack on the heterogeneous computer system is met based on patterns of multiple previous attacks clustered together and the number of different architectures; and generating an alert if the threshold condition for the attack on the heterogeneous computer system is met, wherein the illegal instruction error is triggered by an instruction encoded in a third instruction set different from the first and second instruction sets.

16. The non-transitory computer readable medium of claim 15, wherein the program instructions further adapt the processing apparatus for:

loading a plurality of instruction streams, each of the plurality of instruction streams being equivalent and being encoded in a different instruction set of a plurality of instruction sets;

executing, in a context, a first stream of the plurality of instruction streams;

stopping execution of the first stream at a first location of the first stream; and executing, in the context, a second stream of the plurality of instruction streams at a second location of the second stream, the second location corresponding to the first location of the first stream, wherein the illegal instruction error is triggered by a program instruction encoded in a first instruction set, the first instruction set being different from the instruction sets of the first stream and the second stream.

* * * * *